United States Patent [19]

Ogura

[11] Patent Number: 4,945,590
[45] Date of Patent: Aug. 7, 1990

[54] VALVE FOR FLUID MAT AND APPARATUS FOR CONTROLLING AN ATTITUDE ASSUMED BY FLUID MAT

[75] Inventor: Junshiro Ogura, Tokyo, Japan
[73] Assignee: Ogura Jewel Industry Co., Ltd., Tokyo, Japan
[21] Appl. No.: 333,930
[22] Filed: Apr. 6, 1989

Related U.S. Application Data

[62] Division of Ser. No. 268,407, Nov. 8, 1988, Pat. No. 4,895,183.

[51] Int. Cl.$^5$ .............................................. A47C 27/10
[52] U.S. Cl. ............................................ 5/456; 5/453
[58] Field of Search ........................... 5/455, 456, 453

[56] References Cited

U.S. PATENT DOCUMENTS

| | | | |
|---|---|---|---|
| 3,392,412 | 7/1968 | Aymar | 5/453 |
| 3,477,071 | 11/1969 | Emerson | 5/456 |
| 3,485,240 | 12/1969 | Fountain | 5/456 |
| 3,667,075 | 6/1972 | Ballard et al. | 5/456 |
| 3,775,781 | 12/1973 | Bruno et al. | 5/456 |
| 3,784,994 | 1/1974 | Kery | 5/456 |
| 4,711,275 | 12/1987 | Ford et al. | 5/455 |

FOREIGN PATENT DOCUMENTS

86/06624 11/1986 World Int. Prop. O. .............. 5/456

Primary Examiner—Gary L. Smith
Assistant Examiner—Michael J. Milano
Attorney, Agent, or Firm—Armstrong, Nikaido, Marmelstein, Kubovcik & Murray

[57] ABSTRACT

A valve in the form of a solenoid valve includes a valve seat made of magnetic material in which a solenoid is received, and an inner diameter part of the value seat serves as a passage through which fluid flows. The valve is used for controlling an attitude assumed by an air mat. A valve assembly comprising the first-mentioned valve and an auxiliary valve may be used for the air mat.

1 Claim, 4 Drawing Sheets

VALVE FOR FLUID MAT AND APPARATUS FOR CONTROLLING AN ATTITUDE ASSUMED BY FLUID MAT

This is a continuation of application Ser. No. 268,407 filed Nov. 8, 1988 now U.S. Pat. No. 4,895,183.

BACKGROUND OF THE INVENTION

1. Field of the Invention

The present invention relates to a valve usable for a fluid mat and an apparatus for controlling an attitude assumed by the fluid mat and more particularly to a valve in the form of a solenoid valve usable for a fluid mat which is designed in a small size and assures that valve opening and closing operations are performed at a high speed and an apparatus for controlling an attitude assumed by the fluid mat comprising a plurality of bags wherein introducing of a fluid into the bags and discharging of the same therefrom are controlled separately for the respective bags using the valves.

2. Prior Art

A valve usable for a fluid mat comprising a plurality of bags is usually used by inserting it directly between the adjacent bags and therefore it is necessary that it is designed in a small size. A conventional valve for a fluid mat is provided with an electromagnet adapted to open and close it. A rod-shaped electromagnet has been hitherto utilized for a valve of the type including an electromagnet for opening and closing operations. However, it is difficult to generate a high intensity of electromagnetic force using a rod-shaped electromagnet designed in a small size and moreover it is difficult to open or close the valve within a very short period of time and assure reliable valve opening and closing operations with the rod-shaped electromagnet.

A fluid mat of the type comprising a plurality of bags which are communicated with one another, particularly, for the purpose of adjusting an attitude of sick person lying thereon as required by successively introducing a fluid into the bags through communication opening is known. This type of fluid mat is equipped with a plurality of solenoid valves disposed at communication portion between the adjacent bags, which causes the fluid mat to be manufactured at an expensive cost. Another problems are such that the whole mat is bulky and its operation is troublesome because when introducing of a fluid into the bags is shifted to discharging of the same therefrom and vice versa, operation of a pump should be once interrupted and thereafter the valves should be actuated so as to permit next operation to be initiated.

With respect to the fluid mat constituted by plural bags, it is sometimes necessary that fluid is not only successively introduced into the respective bags but also it is separately introduced into the respective bags or it is simultaneously introduced into all the bags. However, as long as the conventional type of solenoid valves are used for the fluid mat, it has been found that the aforementioned functions are attained only with much difficulties.

SUMMARY OF THE INVENTION

The present invention has been made with the foregoing problems in mind and its object resides in providing a valve in the form of a solenoid valve usable for a fluid mat which is designed in small dimensions and assures that valve opening and closing operations are performed at a high speed.

Other object of the present invention is to provide an apparatus for controlling an attitude assumed by a fluid mat comprising a plurality of bags which is simple in structure and assures that fluid can be separately introduced into and discharged from the respective bags with ease.

Another object of the present invention is to provide a valve in the form of a solenoid valve usable for a fluid mat for which a doughnut-shaped electromagnet of which cross-section exhibits an U-shaped contour is used to provide a fluid passage within the inner diameter part thereof, taking into account the fact that the electromagnet having an U-shaped cross-sectional contour generates a higher intensity of magnetic force compared with a rod-shaped electromagnet.

Further another object of the present invention is to provide a valve in the form of a solenoid valve usable for a fluid mat which comprises a doughnut-shaped valve seat made of magnetic material of which cross-section exhibits an U-shaped contour and of which inner diameter part serves as a fluid passage, a valve disc made of magnetic material to open and close the fluid passage in the valve seat and a solenoid located in the interior of the valve seat having an U-shaped cross-sectional contour.

Still another object of the present invention is to provide a valve assembly usable for a fluid valve comprising a main valve and an auxiliary valve both of which are designed in the form of a solenoid valve wherein the main valve comprises a doughnut-shaped valve seat made of magnetic material of which cross-section exhibits an U-shaped contour and of which inner diameter part serves as a fluid passage, a valve disc made of magnetic material to open and close the fluid passage in the valve seat, the valve disc being located on a first plane side of the valve seat, and a solenoid immovably held in the valve seat and wherein the auxiliary valve located on a second plane side of the valve seat is intended to open and close the fluid passage and comprises a valve member having a small through hole formed thereon through which fluid is gradually introduced into the fluid passage when the auxiliary valve closes the fluid passage and electromagnet means adapted to displace the valve member.

Still further another object of the present invention is to provide an apparatus for controlling an attitude assumed by a fluid mat which assures that introducing of fluid into the fluid mat and discharging of the same therefrom are achieved by actuation of the respective valves without any necessity for stopping operation of a fluid pump.

These and other objects, features and advantages will become readily apparent from a reading of the following description which has been made in conjunction with the accompanying drawings.

DETAILED DESCRIPTION OF THE PREFERRED EMBODIMENT

Now, the present invention will be described in a greater detail hereunder with reference to the accompanying drawings which illustrate preferred embodiments thereof.

Figure 1:
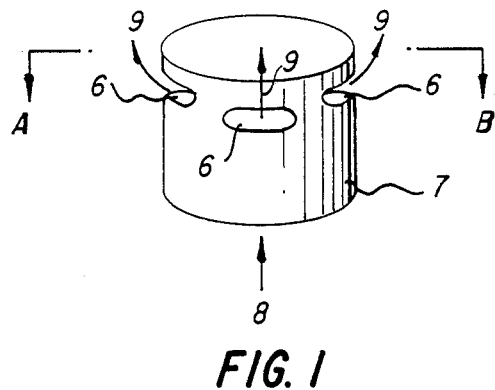
FIG. 1 is a perspective view illustrating a valve usable for a fluid mat in accordance with a first embodiment of the present invention.
Figure 2:
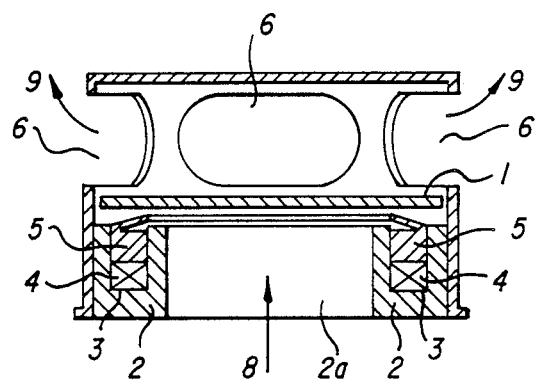
FIG. 2 is a sectional view of the valve taken in line A - B in FIG. 1

FIG. 1 is a perspective of a valve usable for a fluid mat in accordance with a first embodiment of the present invention and FIG. 2 is a vertical sectional view of the valve taken in line A - B in FIG. 1.

As shown in FIG. 1, the valve is accommodated in a generally cylindrical casing 7 of which upper side surface is formed with a plurality of openings 6 through which air flows. As represented by an arrow mark 8, air is introduced into the valve from the below and it is then discharged therefrom through the openings 6 in the direction as identified by arrow marks 9.

As is apparent from FIG. 2, a doughnut-shaped valve seat 2 and a valve disc 1 located above the valve seat 2 are disposed in the interior of the valve so that fluid flows through the openings 6 in the direction as identified by arrow marks 9 via an inner diameter part 2a of the valve seat 2. The valve seat 2 is made of magnetic material and a solenoid 4 is accommodated in the interior of the valve seat 2. In the first embodiment, an annular groove 2b is formed on the upper surface of the valve seat 2 so as to allow the latter to assume an U-shaped cross-sectional shape, and the solenoid 4 is received in the groove 2b. In addition, a ring-shaped packing 5 is disposed at the upper part of the valve seat 2 in order to assure airtight sealing between the valve disc 1 and the valve seat 2. The packing 5 is intended to assure that the lower surface of the valve disc 1 comes in close contact with the upper surface of the valve seat 2. If the valve seat 2 could be machined to assure airtight engagement of the valve disc 1 with the valve seat 2, provision of the packing 5 will not be required.

Figure 2A:
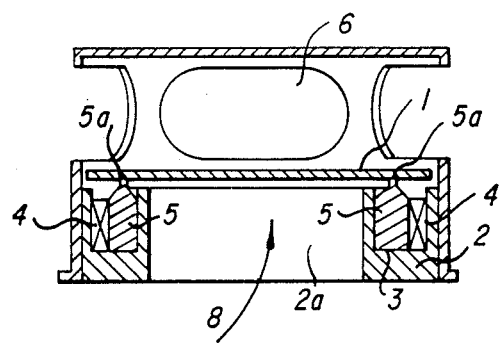
FIG. 2a is a sectional view similar to FIG. 2 illustrating a valve usable for a fluid mat in accordance with a modified embodiment of the present invention.

The valve disc 1 is made of magnetic material and located above the valve seat 2 so that it is attracted to the valve seat 2 side when the solenoid 4 received in the valve seat 2 is turned on. When the solenoid 4 is turned off, the valve disc 1 is parted away from the upper surface of the valve seat 2 whereby the annular fluid flowing passage is kept open. Incidentally, in the first embodiment, the annular groove 2b is formed on the upper part of the valve seat 2 and the solenoid 4 is received in the groove 2b. However, the present invention should not be limited only to this. Alternatively, an annular groove is formed round the outer peripheral part of the valve seat 2 so as to permit the solenoid 4 to be received therein. Further, an annular groove may be formed round the inner peripheral part of the valve seat so as to permit the solenoid 4 to be received therein. Further, the solenoid 4 may be embedded in the interior of valve seat 2. Additionally, the solenoid 4 and the packing 5 may be inserted in the annular groove in a side-by-side relationship as shown in FIG. 2a wherein the packing 5 is provided with an annular projection 5a with which the valve disc 1 is brought in airtight contact.

Since the solenoid 4 is received in the interior of the valve seat 2 in accordance with the first embodiment, a very high intensity of magnetic force can be generated in comparison with a conventional type of valve including a solenoid wound round a rod-shaped core made of magnetic material. In addition, since the annular fluid passage is located atop of the inner diameter part of the valve seat 2, the whole valve can be designed in a thin structure having smaller dimensions. Further, since the solenoid 4 is received in the valve seat 2, an outer diameter of the valve can be reduced.

Next, description will be made below as to a valve assembly in accordance with a second embodiment of the present invention with reference to FIGS. 3 and 4.

This second embodiment is such that an auxiliary solenoid valve is operatively associated with the above-described valve in accordance with the first embodiment.

Indeed, the second embodiment represents an example wherein an auxiliary solenoid valve is provided to make it possible to reliably open and close the valve also in a case where fluid flowing throughout the interior of the valve has an excessively high intensity of pressure or a plurality of receptacles required for whole or part of fluid to be stored or discharged are connected to one another.

Figure 3:
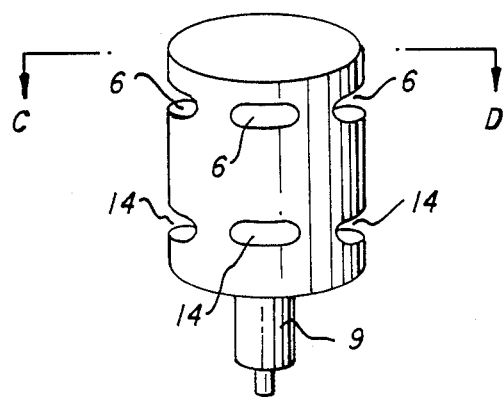
FIG. 3 is a perspective view illustrating a valve assembly usable for a fluid mat in accordance with a second embodiment of the present invention.
Figure 4:
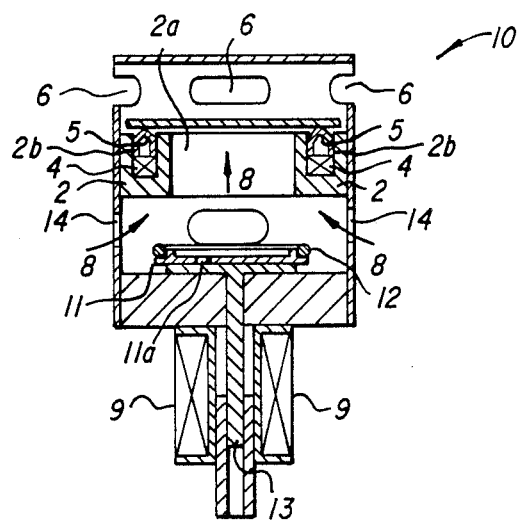
FIG. 4 is a sectional view of the valve assembly taken in line C - D in FIG. 3.

FIG. 3 is a perspective view of the valve assembly in accordance with the second embodiment and FIG. 4 is a sectional view illustrating construction of the valve assembly in FIG. 3. The valve assembly includes a generally cylindrical valve casing and a generally cylindrical driving portion for the auxiliary valve of which diameter is smaller than that of the valve casing. The valve casing is formed with a plurality of inlet openings 14 through which fluid is introduced into the interior thereof and a plurality of outlet openings 6 through which fluid is discharged. As is apparent from FIG. 4, an upper valve unit 10 is identical to the valve in accordance with the first embodiment in structure. Accordingly, repeated description on structure of the upper valve unit 10 will not be required.

As shown in FIG. 4, a valve member 11 serving as a valve disc is disposed below the valve seat 2 and an O-ring 12 adapted to come in close contact with the lower surface of the valve seat 2 is attached to the upper peripheral part of the valve member 11. A rod 13 for displacing the valve member 11 in the vertical direction as viewed in the drawing is secured to the valve member 11. In addition, the valve member 11 is formed with a through hole 11a having a small diameter through which fluid is to be introduced and discharged. The rod 13 extends downwardly of which axis coincides with a center axis of a solenoid type electromagnet 9. When the electromagnet 9 is activated, the valve member 11 is displaced upwardly until it comes in contact with the lower surface of the valve seat 2. The valve member 11 is accommodated in a casing which is a lower extension from the casing for the valve in accordance with the first embodiment. As shown in FIG. 3, a plurality of openings 14 are formed on the casing in which the valve member 11 is accommodated. Fluid flows into the inner diameter part 2a of the valve seat 2 through the openings 14 in the direction as identified by arrow marks 8. FIG. 4 shows an operative state that the upper valve unit is closed. Also in this embodiment, the packing 5 may be formed with an annular projection 5a at its upper part in the same manner as in the first embodiment in FIG. 2a so as to enable the projection 5a to come in close contact with the valve disc 1.

Next, operation of the valve assembly in accordance with the second embodiment will be described below.

First, while fluid flows through the interior of the valve assembly, the valve member 11 assumes its lower position as shown in FIG. 4 and a solenoid 4 in the upper valve unit is turned off. This causes the valve disc 1 to be parted upwardly away from the valve seat 2. Fluid flows into the interior of the valve assembly through the inlet openings 14 in the direction as identified by arrow marks 8a and then it flows out through the outlet openings 6 via the inner diameter part 2a of the valve seat 2.

Sometimes, the valve disc 1 can not be attracted to the valve seat 2 side under the influence of magnetic force generated by the solenoid 4 because of a high intensity of pressure of fluid which has been introduced, when it is required that the upper valve unit 10 is closed while the solenoid 4 is turned on. In this case, the electromagnet 9 is turned on so that the valve member 11 is instantaneously displaced to the lower surface of the valve seat 2 to temporarily prevent fluid from flowing into the interior of the inner diameter part 2a of the valve seat 2. After the valve member 11 has been displaced in that way, the electromagnet 9 is turned off. This causes a pressure of fluid remaining in the interior of the inner diameter part 2a of the valve seat 2 to be reduced quickly whereby the valve disc 1 naturally falls down under the effect of its own gravity force and it is additionally attracted to the valve seat 2 by magnetic force generated by the solenoid 4. By virtue of the provision of the small through hole 11a on the valve member 11, fluid is gradually introduced into the interior of the inner diameter part 2a of the valve seat 2 through the hole 11a. When a pressure of fluid in the interior of the inner diameter part 2a of the valve seat 2 reaches a predetermined level, the valve member 11 is gradually lowered under the effect of its own gravity force. Thus, in spite of the fact that the valve member 11 is parted away from the lower surface of the valve seat 2 and a pressure of fluid is exerted on the lower surface of the valve disc 1, the valve disc 1 can be maintained in close contact with the upper surface of the valve seat 2 against a pressure of fluid introduced into the interior of the inner diameter part 2a of the valve seat 2, because the valve disc 1 has been already brought in close contact with the upper surface of the valve seat 2 under the effect of magnetic force generated by the solenoid 4. Consequently, the valve disc can be kept closed as long as the solenoid 4 is turned on.

In this manner, provision of the auxiliary valve assures more reliable opening and closing of the valve disc. The foregoing embodiment has been described as to the case where the valve member 11 is formed with a through hole 11a. However, the present invention should not be limited only to this. Alternatively, the valve member 11 may be formed with no through hole.

Figure 5:
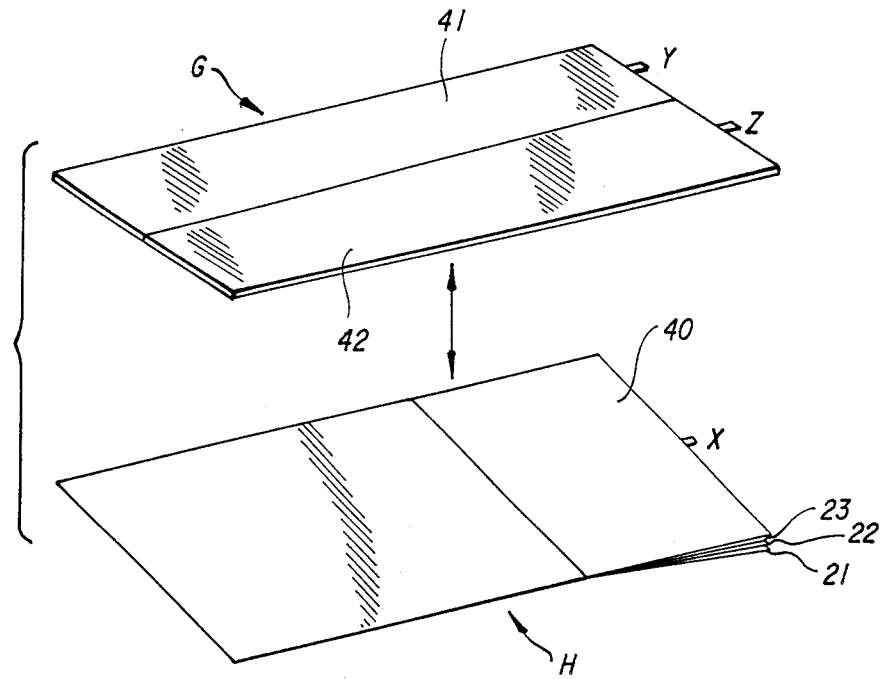
FIG. 5 is a perspective view illustrating in a disassembled state a fluid mat of which attitude can be adjusted for a sick person lying thereon.

Next, description will be made below as to a third embodiment with reference to FIGS. 5, 6 and 7.

The third embodiment is concerned with an apparatus for controlling an attitude assumed by and air mat of the type including a plurality of bags in which valves or valve units in accordance with the above-described first or second embodiment are incorporated so as to allow air to be introduced into or discharged from each of the bags. The apparatus is appliable to, for instance, an air mat including bags 40, 41 and 42 as shown in FIG. 5. As is apparent from the drawing, the air mat is constituted by two separate air mat portions in such a manner that the upper mat portion G includes bags 41 and 42 and the lower mat portion H includes a bag 40. By virtue of provision of the two separate air mat portions, it is possible to lay a person on the air mat while taking a sideward oriented attitude by selectively introducing air into one of the bags 41 and 42 constituting the upper mat portion G or raising up the upper part of the body of a person on the air mat by introducing air into the bag 40 of the lower mat portion H. It should be noted that the bag 40 of the lower mat portion H is constituted by a plurality of bag segments 21, 22 and 23 as shown in FIG. 5. To permit air to be introduced into and discharged from the respective bags 40, 41 and 42, pipes X, Y and Z are connected to them.

Figure 6:
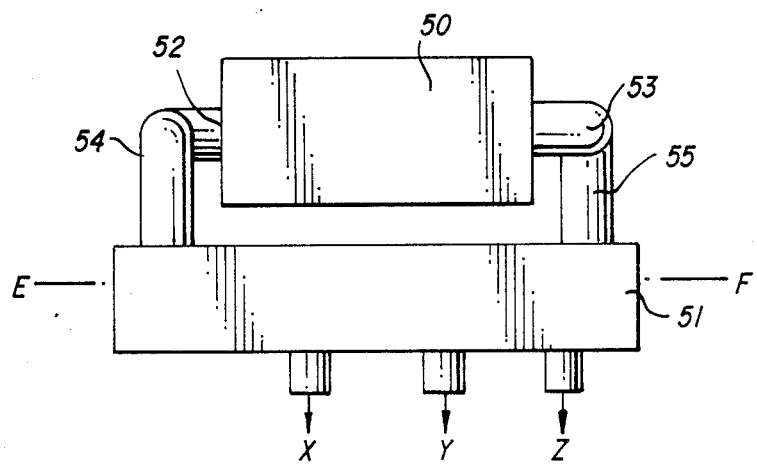
FIG. 6 is an outside view illustrating a valve assembly usable for a fluid mat in accordance with a third embodiment of the present invention.
Figure 7:
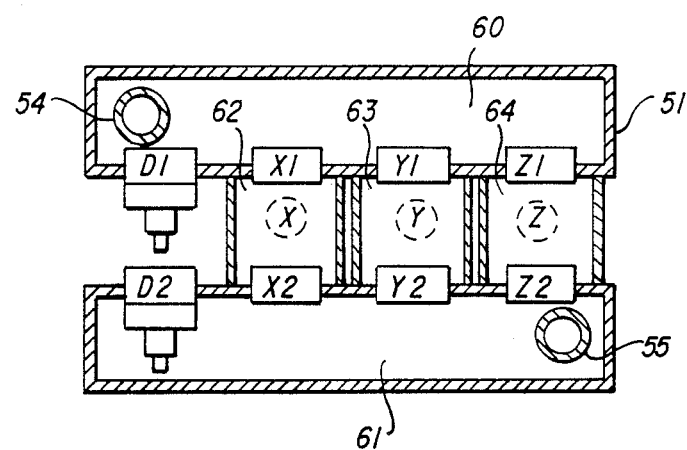
FIG. 7 is a sectional view of the valve assembly taken in line E - F in FIG. 6.

FIG. 6 is an outside view illustrating the apparatus in accordance with the third embodiment. The apparatus comprises a pump 50 for the purpose of feeding and discharging air and a valve assembly 51. In the apparatus the pump 50 includes a discharging port 52 and a feeding port 53 both of which are communicated with the valve assembly 51. Since the apparatus is so constructed that air discharging and feeding are achieved by means of a single pump, the whole apparatus is simple in structure. It should be noted that any pump is available for the apparatus, provided that it has a capacity of completely filling all the bags for the air mat with air.

The valve assembly 51 includes an air discharging chamber 60 and an air feeding chamber 61 both of which are communicated with the discharging port 52 and the feeding port 53 of the pump 50 via pipes 54 and 55. The discharging chamber 60 and the feeding chamber 61 are equipped with solenoid valves D1 and D2 to make a communication with an environment therethrough. As shown in FIG. 7, air feeding and discharging chambers 62, 63 and 64 having ports X, Y and Z connected to the respective bags 40, 41 and 42 are arranged in a side-by-side relationship between the discharging chamber 60 and the feeding chamber 61. By virtue of the arrangement of the feeding and discharging chambers 62, 63 and 64 in the above-described manner, the whole apparatus can be designed in a compact structure. However, the present invention should not be limited only to this. Alternatively, the respective feeding and discharging chambers may be jointed to one another via pipes or the like means instead of their arrangement in the side-by-side relationship as mentioned above. Solenoid valves X1, Y1 and Z1 are provided between the feeding and discharging chambers 62, 63 and 64 and the discharging chamber 60, while another solenoid valves X2, Y2 and Z3 are provided between the feeding and discharging chambers 62, 63 and 64 and the feeding chamber 61. Valves in accordance with the first and second embodiments can be used for the solenoid valves D1, D2, X1, Y1 and Z1. Particularly, it is preferable that valve assemblies in the second embodiment are used for the solenoid valves D1 and D2. This is because of the fact that the valve assemblies function properly irrespective of a high intensity of pressure of air to be discharged therefrom and fed thereto. It should of course be noted that other type of conventional solenoid valve may be employed for them.

When the solenoid valves in accordance with the first and second embodiments are used, the valve disc side of the solenoid valve D1 is communicated with the discharging chamber 60 and the valve seat side of the same is communicated with the environment, while the valve disc side of the solenoid valve D2 is communicated with the environment and the valve seay side of the same is communicated with the feeding chamber 61. Additionally, the valve seat side of the respective solenoid valves X1, Y1 and Z1 is communicated with the port side and the valve disc side of the same is communicated with the discharging chamber 60 side, while the valve disc side of the solenoid valves X2, Y2 and Z2 is communicated with the feeding chamber 61 side.

Each of the solenoid valves has a switch (not shown) connected thereto so as to enable air to be introduced into and discharged from the respective bags constituting an air mat by individually shifting switches.

Next, operation of the apparatus in accordance with the third embodiment will be described below.

Firstly, in a case where only the bag 41 is expanded by introducing air thereinto as well as in a case where only the bag 41 is contracted by discharging air therefrom, the respective solenoid valves are set to the following state.

|  |  | in case where bag is expanded | in case where bag is contracted |
|---|---|---|---|
| solenoid valve | D1 | opened | closed |
|  | X1 | closed | opened |
|  | X2 | opened | closed |
|  | Y1 | closed | closed |
|  | Y2 | closed | closed |
|  | Z1 | closed | closed |
|  | Z2 | closed | closed |
|  | D2 | closed | opened |

Specifically, in the case where the bag is expanded, the pump is operated while the solenoid valve D1 is kept open so that air is fed to the feeding chamber 61 via the discharging chamber 60, the discharging pipe 54, the discharging port 52, the pump 50, the feeding port 53 and the feeding pipe 54 and it is then introduced into the bag via the solenoid valve X1 and the port X. This causes the bag 40 to be expanded as required. On the contrary, in the case where it is contracted, air in the bag 40 is discharged therefrom to the outside via the port X, the solenoid valve X1, the discharging chamber 60, the discharging pipe 54, the discharging port 52, the pump 50, the feeding port 53, the feeding pipe 55, the feeding chamber 60 and the solenoid valve D2, while the pump 50 is operated. Incidentally, with respect to the solenoid valves which are not related directly to feeding and discharging of air, it is not required that their opening and closing operations are specified individually.

When it is required that plural bags, for instance, the bags 40 and 41 are simultaneously expanded, what is to be done is to simultaneously open the solenoid valves X2 and Y2 which are communicated with them via the associated ports. On the contrary, when it is required that they are contracted, the solenoid valves X1 and Y1 communicated therewith are simultaneously opened. Additionally, when it is required that for instance, the bags 40 and 41 are contracted and thereafter the bag 42 which has been kept in a contracted state is expanded under a proper combination of opening and closing operations of the associated solenoid valves, air is discharged from the bags 40 and 41 by shifting the associated valves at a first stage and thereafter air is introduced into the bag 42 by shifting the associated solenoid valves at a second stage in compliance with an operative state specified below.

|  |  | first stage | second stage |
|---|---|---|---|
| solenoid valve | D1 | closed | opened |
|  | X1 | opened | closed |
|  | X2 | closed | closed |
|  | Y1 | opened | closed |
|  | Y2 | closed | closed |
|  | Z1 | closed | closed |
|  | Z2 | closed | opened |
|  | D2 | opened | closed |

As will be readily apparent from the above description, required operation can be performed by shifting the respective solenoid valves in such a manner as mentioned above. Since it is believed that the above operative states can be readily understood by any expert in the art with reference to the previously mentioned operative states, repeated description will not be required. It should be noted that an extent of expansion can be freely selected by opening and closing the associated solenoid valves at a properly determined time.

By using the above-described apparatus, an air mat can be set to a required attitude at all times. Further, since feeding and discharging of air can be forcibly achieved, setting of the air mat to a required attitude can be completed within short period of time.

What is claimed is:
1. An apparatus for controlling an attitude assumed by an air mat having a plurality of bags comprising:
   a first air discharging chamber and a first air feeding chamber both of which are communicated with a pump,
   a plurality of secondary air discharging and feeding chambers communicating with said first air discharging chamber and said first air feeding chamber, respectively, via valves, each of said secondary air discharging and feeding chambers being formed with a port which is communicated with one of said bags, said secondary air discharging and feeding chambers being arranged between said first air discharging chamber and said first air feeding chamber, said secondary air discharging and feeding chambers being connected to one another in a side-by-side relationship with a partition interposed between the adjacent secondary air discharging and feeding chambers, and
   a plurality of valves, each in the form of a solenoid valve disposed on said first air discharge chamber and said first air feeding chamber.

* * * * *